Aug. 3, 1965 H. T. MORTIMER 3,199,090

MAGNETIC STORAGE DEVICE

Filed Dec. 4, 1961 2 Sheets-Sheet 1

INVENTOR.
HARRY T. MORTIMER

BY Allan Rothenberg

ATTORNEY

Aug. 3, 1965 H. T. MORTIMER 3,199,090

MAGNETIC STORAGE DEVICE

Filed Dec. 4, 1961 2 Sheets-Sheet 2

INVENTOR.
HARRY T. MORTIMER

BY Allen Rothenberg

ATTORNEY 3,199,090
MAGNETIC STORAGE DEVICE

Harry T. Mortimer, Anaheim, Calif., assignor to North American Aviation, Inc.

Filed Dec. 4, 1961, Ser. No. 156,586
4 Claims. (Cl. 340—174)

Figure 1:
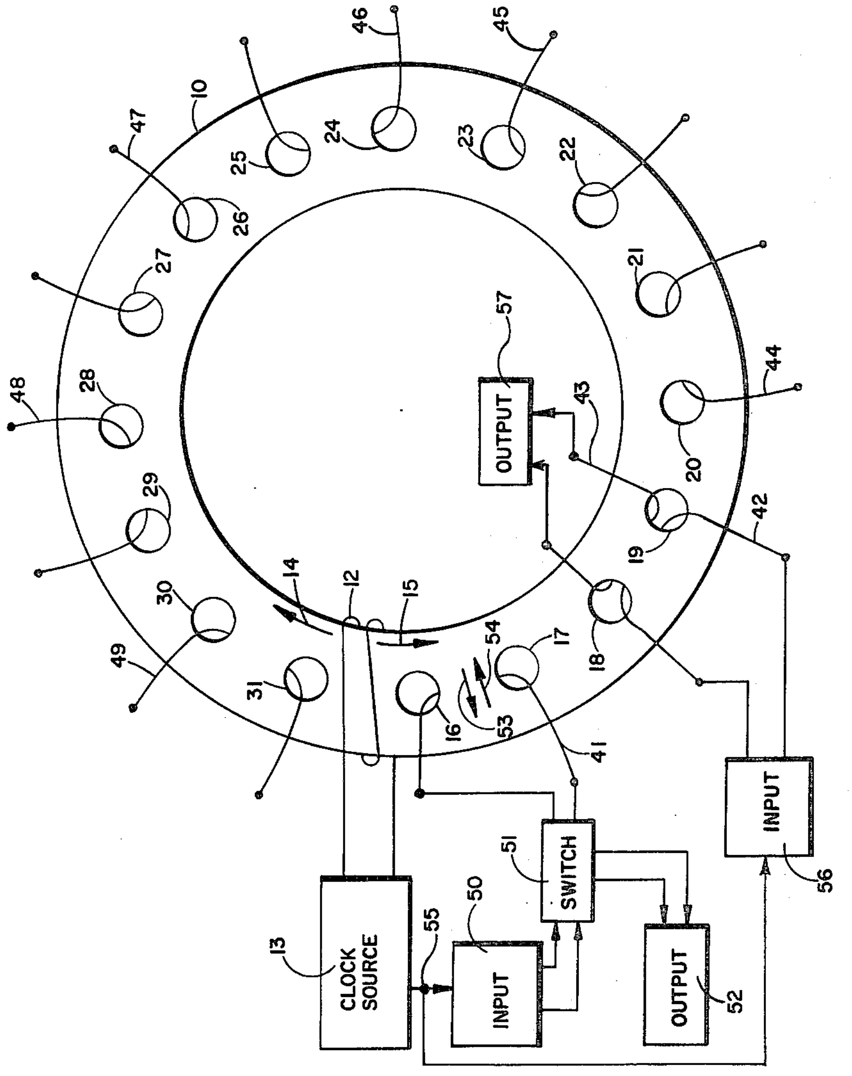
Figure 2:
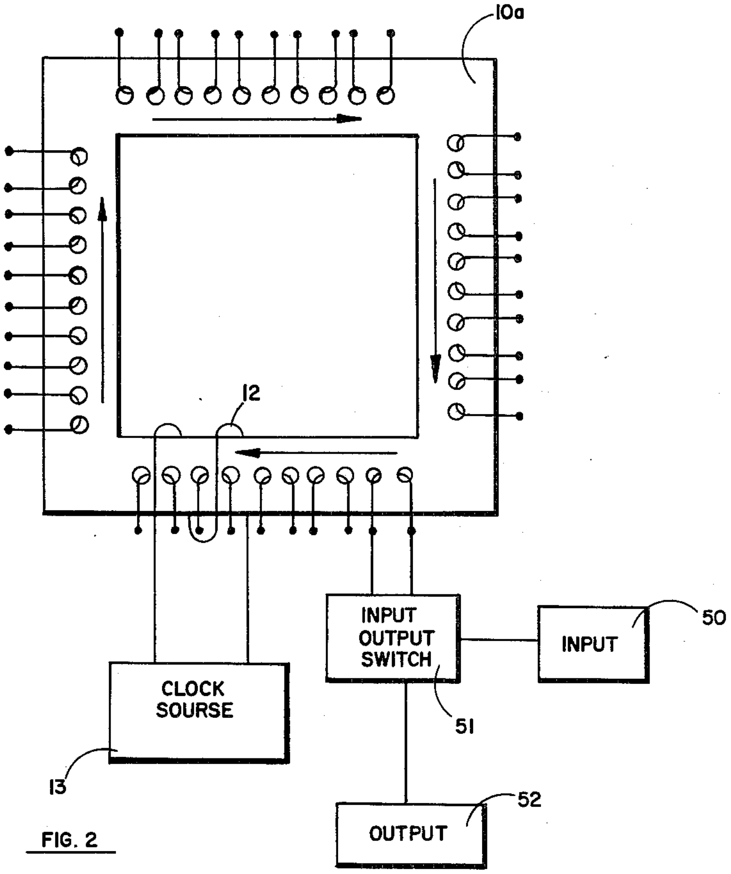

This invention relates to a magnetic storage of information and particularly concerns magnetic storage devices providing non-destructive readout of information stored therein.

Non-destructive readout of information stored in magnetic cores has been achieved by employing a pair of apertures in a core with an interrogation or sampling winding thereon in addition to conventional input and output winding. Such an arrangement is shown in the Patent No. 2,902,676 to E. A. Brown, wherein a core having conventional input and output windings also has an interrogation winding wound through a pair of apertures in the core body. Upon energization of the interrogation winding, an output pulse is induced in the output winding dependent upon the sense of the remanent state of the core. The application of the interrogation pulse does not change the state of the core whereby the readout is non-destructive. With such an arrangement, separate input and output windings are required for each core together with a separate interrogation winding therefor. Further, each core can store but a single unit of information.

Plural storage of information in a single body of magnetic material has been suggested in several forms. In the patent to Kuntzleman, No. 2,944,249, for example, a single magnetic core is provided with a plurality of individual magnetic circuits. These circuits are provided by the use of a number of mutually spaced apertures extending circumferentially about the core and each having an input winding thereon. For operation of the device of Kuntzleman, there are required two oppositely disposed primary magnetic circuits together with windings to produce energization in such circuits. Further, sensing of individual units of stored information is provided by use of a separate interrogation winding for each unit of information together with a separate sensing winding therefor. The individual interrogation and sensing windings are coupled with the remainder of the circuitry by means of still other apertures in the core body. Such arrangement is undesirable in that it requires many different windings for each unit of information, a large number of apertures in the core and a complex arrangement of plural magnetic circuits.

Common input and output windings have been suggested. In the patent to Lamy, No. 2,814,792, for example, a plurality of storage positions in a magnetic core are provided, each with a single winding for both input and output functions. To store a signal in any given position, a pulse is applied to the associated winding. Since each winding must be pulsed separately for storing in the respective positions, a considerable amount of power is used for the storing operations.

Accordingly, it is the object of this invention to provide an improved storing system for a magnetic storage device having a plurality of storage positions.

In carrying out the principles of this invention, in accordance with a preferred embodiment thereof, a single body of magnetic material is arranged to provide a closed magnetic path and is formed with a plurality of apertures in the body spaced from each other in the direction of the magnetic path with mutually adjacent apertures providing an aperture pair. Information winding means is provided in the form of one or more turns about that portion of the magnetic body between the apertures of a pair. This winding means is arranged to both induce and sense a local magnetix flux pattern which extends between the apertures substantially normal to the closed magnetic path. An input device and an output device are connected to the information winding means. In one embodiment, the information winding means may comprise a single coil alternatively connected to the input and output devices. In an alternative arrangement, the information winding means may comprise an input coil or loop and an output coil or loop each wound about the same portion of the body and connected to respective input and output devices. A suitable clock signal source is connected to a clock or interrogation winding wound about the body, to provide a periodic magnetic flux through the entire closed loop path of the body and to the input device. A signal of one polarity or the other from the input device to the input winding in synchronism with a clock signal to the clock winding will cause the information winding to provide a local magnetic flux pattern extending substantially normal to the closed magnetic path of the body. Upon removal of the input signal, this magnetic flux pattern remains as a remanent flux. Upon subsequent energization of the clock winding to provide a magnetic flux through the closed path of the body, the local remanent flux acts in the manner of a switch to couple the clock induced flux to the information winding means or, more specifically, to the output winding thereof (where two information windings are used). The signal induced in the output winding will have a polarity depending upon the polarity of both the initial local remanent state provided by the input signal and the polarity of the clock source. Upon removal of the clock signal the local remanent flux provided between the two apertures remains substantially unchanged.

The arrangement of this invention is particularly suited to achieve plural storage of plural units of information in a single closed loop magnetic body by providing, for example, a single magnetic ring lamination, or thin magnetic core with a large number of substantially equally spaced apertures spaced from each other circumferentially along the mean circumference of the core. Each adjacent pair of apertures may have an input winding and an output winding formed on the magnetic material between respective apertures forming the pair, whereby each pair will provide an independent unit of storage and will also have means to afford independent readout of the information stored therein. With this arrangement there is required but a single interrogation winding wound on the core. Upon energization of the interrogation winding, readout is available from all of the output windings. Many arrangements and configuration of one or more of each plural unit storage elements will be readily apparent to those skilled in the art so as to provide serial, serial-parallel, or parallel type memories of large capacity.

These and other objects and many of the attendant advantages of the invention will become apparent from the following description taken in connection with the accompanying drawings in which the sole figure illustrates schematically an embodiment of the principles of the invention.

As illustrated in the figure, there is provided a magnetic body comprising a closed loop of magnetic material in the form of an annulus or relatively thin ring-type lamination 10. The lamination 10 may be made from any type of core material embodying high permeability nickel iron alloys. With a material of this type, the energy associated with rotation of the magnetization vector relative to the domain orientation 90° away from the preferred or "easy" direction of magnetization, is low. In other words, the material does not require significantly more energy to effect magnetization in the "hard" direction than is required in the "easy" direction. Materials such as Hy Mu 80 and Sq Mu 49 are typical of those which are suitable for application to the principles of this invention. With the use of such domain-oriented material, the closed loop core may be formed advantageously in a rectangular rather than circular configuration. The magnetic body 10 can be locally magnetized in a direction substantially normal to the "easy" direction of magnetization without effecting the net flux in the core. Normally the "easy" direction of magnetization will be directed circumferentially about the core.

Wound about the lamination 10 is a clock or interrogation winding 12 having a suitable connection to a periodic clock source 13 which is capable of providing unipolar pulses varying between zero and either a positive or a negative potential. In the alternative, the clock source may be arranged to supply bi-polar pulses in the form of a square wave varying in polarity from half cycle to half cycle. When the clock signal is of one polarity, such as positive for example, a continuous flux will extend through the closed magnetic path provided by the ring lamination in a direction such as that indicated by arrow 14. If the polarity of the clock pulse should be of the opposite sense, negative, for example, magnetic flux will extend about the circumference of the ring lamination in the direction of arrow 15.

A number of holes 16 through 31 inclusive are formed in the ring lamination 10 as by punching, stamping, etching, or the like. Mutually adjacent holes such as 16, 17, and 18, 19 or 20, 21, etc. form hole pairs having wound about the magnetic material extending therebetween an information winding means 41–49 each of which comprises at least one winding. While the several windings are illustrated as comprising but a single turn looped about the core material extending between adjacent holes it will be readily appreciated that plural turns may be provided for each winding as deemed necessary or desirable.

The hole pair 16–17 has a single information winding 41 comprising a single turn looped about the magnetic material extending between the holes 16–17. An input device 50 is provided for energizing the winding 41 with an input signal having one of two alternatively selected opposite polarities. There is provided a two-position switch 51 interposed between the information winding 41 and input device 50 for the purpose of connecting the input to the winding when the switch is in one position. In a second position of the switch the winding 41 is disconnected from the input device and connected to a suitable output device 52. When there is provided to the information winding 41 an input signal of positive polarity, for example, there is set up in the magnetic material between apertures 16 and 17, a local flux pattern having a magnetization as indicated by the arrow 53. When the input signal is removed, a local remanent magnetization will exist in the magnetic material between holes 16 and 17 as indicated by the arrow 53. On the other hand, an input from input device 50 to the information winding 41 of the opposite polarity, negative for example, will result in a local remanent flux vector indicated by the arrow 54 between the holes 16 and 17.

The remanent flux vector whether as indicated by 53 or 54 provides a coupling condition between periodic or fluctuating flux generated by the clock winding 12 and an information winding wound about the magnetic material between the holes 16 and 17. Accordingly, if, after the local storage area between holes 16 and 17 has been provided with a remanent flux of one state or the other, as indicated by one or the other of arrows 53 and 54, a signal is sent from the clock source 13 to energize clock winding 12, a magnetic flux will flow around the circumference of the ring lamination 10 and be coupled out to the information winding 41 with a polarity according to the polarities of both the remanent local flux and the clock flux. At such time the switch 51 may be suitably shifted to couple the winding 41 to the output device 52 which will receive a signal of appropriate polarity according to the state of both the local remanent flux and the polarity of the clock signal. Upon removal of the clock signal the local flux returns substantially to the condition existing before application of the clock pulse to the device whereby the readout has been achieved without destruction of the information stored locally between holes 16 and 17.

For a clock signal of positive polarity, as indicated, for example, by the arrow 14, the signal provided to the output device 52 will be of one polarity, positive, for example, if the remanent state of the local area of magnetic material between holes 16 and 17 is positive, as indicated by arrow 53. If the local state is negative, as indicated by arrow 54, the output signal is negative for such positive polarity of the clock pulse. On the other hand, if the clock signal should be of negative polarity, as indicated for example by the arrow 15, a remanent state, as indicated by arrow 53, will provide a negative output signal while a remanent state, such as that indicated by arrow 54, will provide a positive output signal. Accordingly, it will be seen that if the clock source provides uni-polar pulses of known polarity, the polarity of the output signal indicates which of the two possible states existed in the magnetic material between holes 16 and 17.

If the clock pulse source should comprise a square wave varying in polarity on each half cycle thereof, the remanent state of the local area of magnetic material between holes 16 and 17 is indicated by the phase of the output relative to the phase of the clock signal. Thus with a positive state as indicated by arrow 53, the output signal is positive when the clock is positive and is negative when the clock is negative while the opposite is true for a remanent state of opposite sense.

It has been found that the signal level required of the input device for setting the local magnetic area between a given pair of holes into one flux state or the other can be decreased to as little as one-half or one-fourth of the minimum value required in the absence of a pulse from the clock source if a clock signal exists when the "writing" or application of the input signal is effected. Accordingly, there is provided a synchronizing connection indicated by 55 from the clock source to the input device 50 for the purposes of achieving writing during the existence of the clock signal.

While the information winding, such as that illustrated at 41, may actually comprise but a single winding which is switched as desired between input and output devices for the purpose of writing and reading information into and from the local magnetic storage area, it is preferable for purposes of isolation of input and output to arrange the information windings in the form of two separate windings as indicated by windings 42 and 43 for the hole pair 18, 19. In such an arrangement, the two windings may be identical or if desired, have a different number of turns. In any event the need for switching is avoided and improved isolation of input and output devices is obtained. In this arrangement, the input information winding 42 is connected directly to a suitable input device 56 while the output information winding 43 is connected directly to output apparatus 57. As previously described, the input may be synchronized with the clock source in order to effect energization of the input information winding concurrently with energization of the clock winding.

While the device illustrated in the figure incorporates information windings including both single and double windings, it will be readily appreciated that an actual device will preferably employ the same arrangement for each hole pair in order to provide uniformity of operation. Accordingly, each of the other information windings, 44 through 49, may be switch-connected to input and output devices as illustrated in connection with 41 or in the alternative, each of the appropriate hole pairs may be provided with a second information winding (not shown) with the two windings arranged as illustrated in connection with the hole pair 18–19. There may be provided a number of input devices and a number of output devices equal in number to the number of hole pairs or, if deemed necessary or desirable, a single input device may be selectively switched to a different one of the input information windings. So too, the output windings may be alternatively connected by suitable switch means (not shown) to a single output device. With either arrangement, each hole pair provides for an independent storage of a single unit of information which unit may be written into the apparatus or read out therefrom, independently of all other units. Writing into each storage area is preferably achieved during the existence of a clock signal in order to allow use of a substantially lower level write signal.

While synchronization of the input and clock is provided, it will be seen that readout inherently occurs only during energization of the interrogation winding 12. It may also be noted that energization of the single winding 12 provides a continuous magnetic flux throughout the entire closed loop path whereby each and every remanent state existing between the holes of each hole pair may be coupled out to the associated output equipment. Thus but a single clock source and single interrogation winding is necessary to provide readout of all units of stored information.

While in the arrangement illustrated the hole pairs are comprised of consecutive pairs of different holes such as 16–17 and 18–19, it will be readily appreciated that each hole may comprise one element of two different immediately adjacent hole pairs. Thus, for example, hole 17 which cooperates with hole 16 to provide a local storage area therebetween, may also be arranged to cooperate with the hole 18 to provide a local storage area between holes 17 and 18. With such an arrangement it is only necessary to put an additional information winding on the magnetic material between holes 17 and 18 in the form of a combined output and input information winding similar to winding 41 or, in the alternative, a pair of input and output windings similar to those indicated at 42 and 43. With such an arrangement, instead of achieving storage of simply eight units of information with the configuration illustrated in the drawing, storage of 16 units of information may be achieved. This arrangement is preferably employed with a serial input.

It may be noted that prior to setting a local magnetizable area into one or the other of its remanent states, the energization of the interrogation winding 12 will simply induce the peripheral flux as indicated by arrow 14 or arrow 15, but no signal will be coupled to any output device, since it is the existence of local remanent flux which actually achieves the coupling of the clock flux to the output.

It is to be understood that the number of holes in the ring lamination 10 is merely exemplary since greater or fewer holes and hole pairs may be utilized as deemeed necessary or desirable. If greater storage capacity is desired the device illustrated in the drawing may be suitably connected with one or numbers of other identical or substantially similar ring laminations. Conveniently, such laminations may be closely stacked one upon the other to provide a memory of relatively large capacity.

Although the invention has been described and illustrated in detail, it is to be clearly understood that the same is by way of illustration and example only and is not to be taken by way of limitation, the spirit and scope of this invention being limited only by the terms of the appended claims.

I claim:

1. Magnetic storage apparatus for storing a number of units of information comprising a body of magnetic material providing a closed magnetic path, a plurality of apertures in said body spaced from each other in the direction of said magnetic path, mutually adjacent ones of said apertures providing at least two pairs of apertures, an interrogation winding on said body for providing magnetic flux through said closed loop path, a source of periodic clock signals connected to said winding, a first input and a first output winding on that portion of said body between the apertures of a first one of said pairs of apertures for respectively providing and sensing a local magnetic flux pattern extending substantially normal to said closed magnetic path between the apertures of said first pair, a second input and a second output winding on that portion of said body between the apertures of a second one of said pairs of apertures for respectively providing and sensing a local magnetic flux pattern extending substantially normal to said closed magnetic path between the apertures of said second pair, input means for selectively and individually energizing said first and second input windings, a synchronizing connection from said periodic clock signal source to said input means, and output means coupled with said output windings.

2. Magnetic storage apparatus comprising a closed loop of magnetic material, an interrogation winding on said loop of magnetic material for providing a periodic flux extending the length of said loop, a clock source connected to said winding, a pair of apertures extending through said material, information winding means on the magnetic material extending between said apertures, input means synchronized with said clock source for energizing the information winding during occurrence of said periodic flux to alternatively provide first and second local flux patterns in the loop material between said apertures, output means and means for coupling both said input and output means to said information winding means.

3. Magnetic storage apparatus comprising a closed magnetic circuit in a body of magnetic material, an interrogation winding on said closed magnetic circuit for providing magnetic flux throughout the length of said circuit, a periodic potention source connected to said winding, a pair of apertures extending through said material, an input winding on the magnetic circuit extending between said apertures, an input device for energizing the input winding to alternatively provide one of two mutually distinct local flux patterns in the magnetic material between said apertures, means for synchronizing the input device with said periodic potential source, and an output winding on the magnetic material extending between said apertures.

4. Magnetic storage apparatus for storing a number of units of information comprising a body of magnetic material providing a closed magnetic path, a plurality of apertures in said body spaced from each other in the direction of said magnetic path, mutually adjacent ones of said apertures providing pairs of apertures, an interrogation winding on said body for providing magnetic flux through said closed path, a source of periodic clock signals connected to said winding, a plurality of information windings, one each on that portion of said body between the apertures of each of said pairs of apertures for providing and sensing local magnetic flux patterns extending substantially normal to said closed magnetic path between the apertures of said pairs, input means for selectively and individually energizing said information windings for storing units of information, a synchronizing connection from said periodic clock signal source to said input means, and output means coupled with said information windings.

References Cited by the Examiner

UNITED STATES PATENTS

| | | | |
|---|---|---|---|
| 2,814,792 | 11/57 | Lamy | 340—174 |
| 3,132,327 | 5/64 | Gianola | 340—174 |
| 3,164,812 | 1/65 | Bobeck | 340—174 |

OTHER REFERENCES

Publication I: IBM Technical Disclosure Bulletin, "Parallel Flux Core," by G. Bishop, vol. 3, No. 2, page 61, July 1960.

IRVING L. SRAGOW, *Primary Examiner.*